C. H. JOHNSON.
DRIVING MECHANISM FOR DIVIDED AXLES.
APPLICATION FILED JUNE 14, 1909.
951,914.
Patented Mar. 15, 1910.
2 SHEETS—SHEET 1.
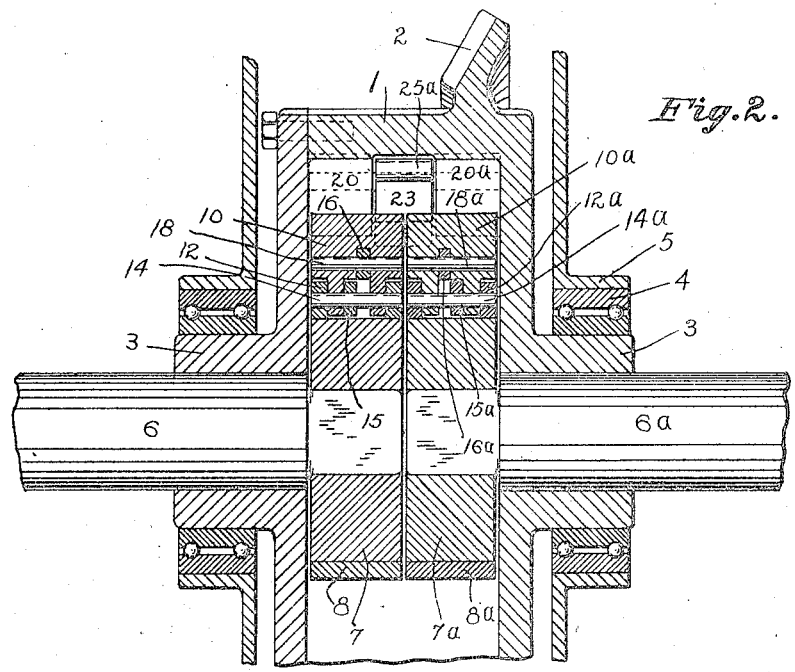
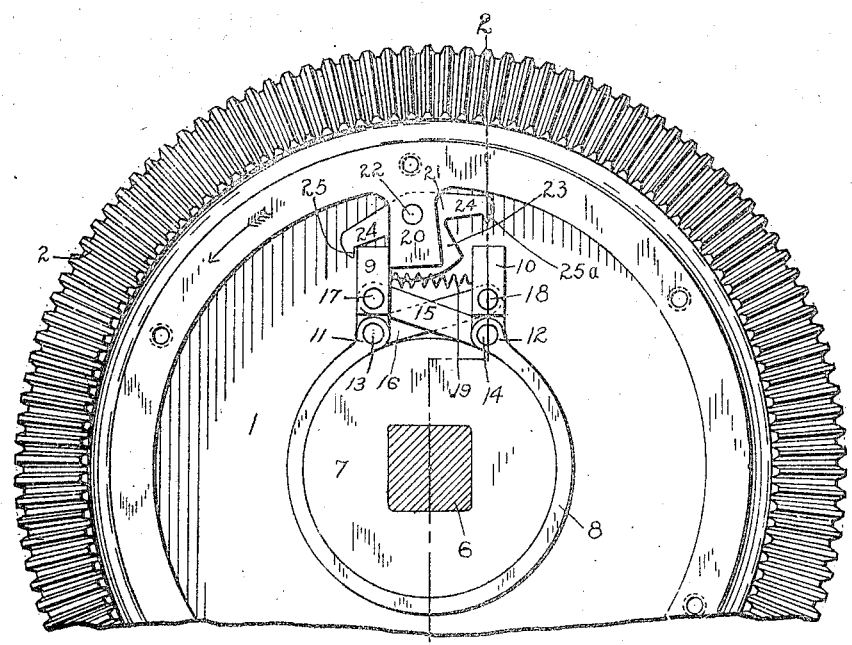
Witnesses:
Wm. R. Rhoads.
Ruth W. Miller
Inventor:
Charles H. Johnson,
By Harry Frease
Attorney.

C. H. JOHNSON.
DRIVING MECHANISM FOR DIVIDED AXLES.
APPLICATION FILED JUNE 14, 1909.

951,914.

Patented Mar. 15, 1910.

2 SHEETS—SHEET 2.

Witnesses:
Wm. R. Rhoads.
Ruth A. Miller

Inventor:
Charles H. Johnson,
By Harry Frease
Attorney.

UNITED STATES PATENT OFFICE.

CHARLES H. JOHNSON, OF CANTON, OHIO, ASSIGNOR TO THE RIDGELY AND JOHNSON TOOL COMPANY, OF SPRINGFIELD, ILLINOIS, A CORPORATION OF ILLINOIS.

DRIVING MECHANISM FOR DIVIDED AXLES.

951,914.  Specification of Letters Patent.  Patented Mar. 15, 1910.

Application filed June 14, 1909. Serial No. 501,887.

*To all whom it may concern:*

Be it known that I, CHARLES H. JOHNSON, a citizen of the United States, residing at Canton, in the county of Stark and State of Ohio, have invented a new and useful Driving Mechanism for Divided Axles, of which the following is a specification.

The invention relates to a clutch for driving divided shafts, like the axles of automobiles and other motor vehicles, in which it is desirable to release either one or both sections of the axle from the clutch to permit the same to rotate free of the driving mechanism, as when the vehicle is making a turn or is coasting down hill. In the first case, it is desirable to automatically reëngage the free section of the axle as soon as a straight course is regained, and in the latter case when both sections of the axle have run ahead of the driving mechanism, it is desirable to reëngage them by the clutch to utilize the resistance of the motor mechanism, to retard the rotation of the wheels. And again, when both axle sections have been clutched against the motor, it is desirable to automatically release and reëngage them by the clutch when necessary to drive them again by the motor. These general objects and purposes of the invention are attained by journaling the inner end portions of the axle sections in a driving drum, and by providing friction disks on the adjoining ends of the sections and clamping rings on the disks, with levers on the rings and lugs and a detent on the drum, whereby either one or both of the rings are clamped or released on the disks by the relative rotation of the drum and either one or both of the axle sections, to accomplish the desired purposes.

A preferred embodiment of the invention as applied to the divided axles of an automobile, is illustrated in the accompanying drawings, forming part hereof, in which—

Figure 4:
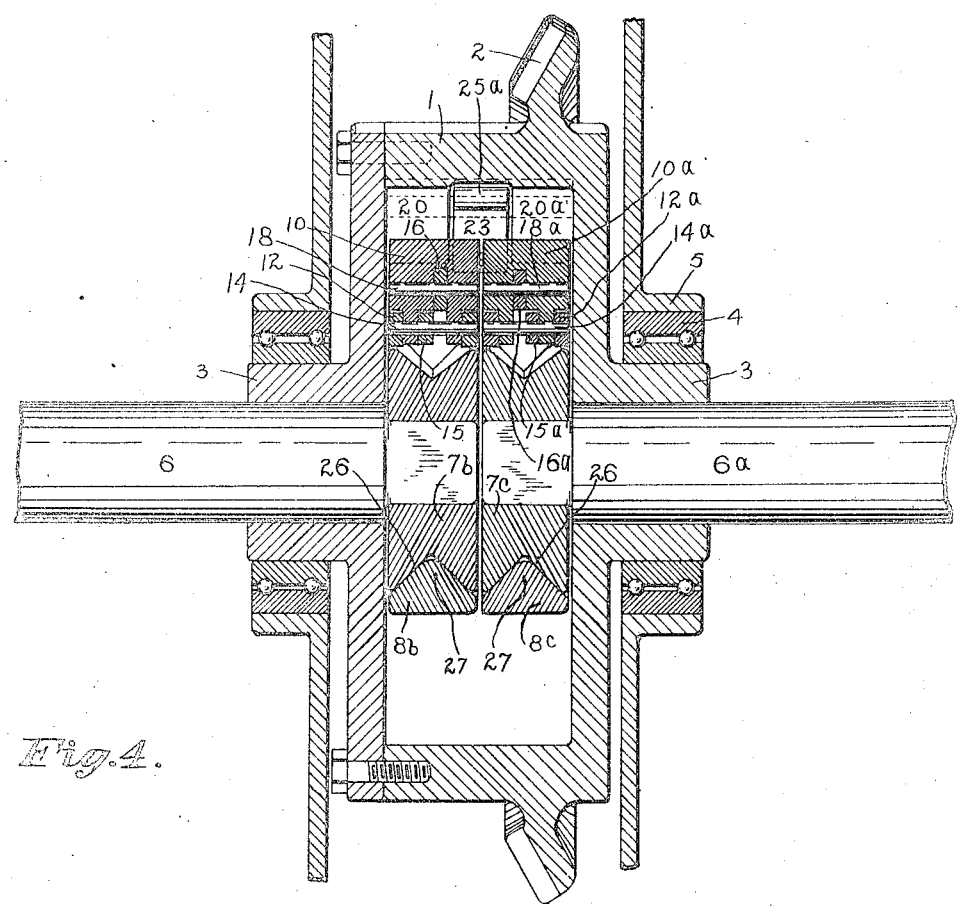
Figure 3:
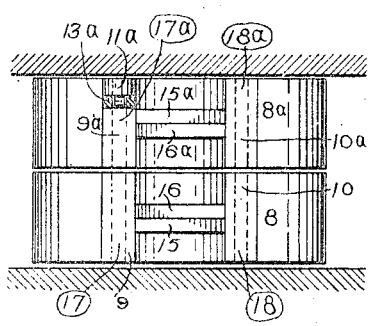

Figure 1 is a side elevation of the drum and clutch mechanism, showing the axle in section and one end of the drum removed; Fig. 2, a longitudinal section of the drum and clutch mechanism on line 2—2, Fig. 1; Fig. 3, a detached plan, partly in section, of the lever and link clamping connections; and Fig. 4, a section similar to Fig. 2, showing modified forms of disks and rings with wedge-shaped friction faces.

Similar numerals refer to similar parts throughout the drawings.

The driving drum 1 is provided with a suitable gear as 2 by means of which it is operated by a suitable motor, not shown, and in the ends of the drum are provided the tubular trunnions 3 which are adapted to rotate in the bearings 4 mounted in the gear housing 5 of the vehicle, not shown, in which trunnions the inner end portions of the axle sections 6 and $6^a$ are preferably journaled as shown. The friction disks 7 and $7^a$ are formed or secured against rotation on the adjoining ends of the axle sections inside the drum, around the peripheries of which disks are provided the clamping rings 8 and $8^a$. Each ring is divided on one side and the levers 9, $9^a$ and 10, $10^a$ are pivoted to the adjacent ends 11, $11^a$ and 12, $12^a$ of the respective rings by means of the pivot pins 13, $13^a$ and 14, $14^a$. The companion levers of each ring are connected by the diagonal links 15, $15^a$ and 16, $16^a$, one end of each link being pivoted on the ring pivot pins and the other end of each link being pivoted to the pins 17, $17^a$ and 18, $18^a$ located in the levers intermediate the ends thereof; by which arrangement it is evident that when the free end of either lever is rotated on its ring-pivot, away from its companion lever, the fulcrum formed by the intermediate pivot and its connecting link serves to clamp the corresponding ring around its friction disk, while a reverse rotation of the free end of either lever toward its companion lever serves to release the grip of the ring around the disk. The rings are preferably made slightly smaller in normal diameter than the disks, so that their inherent elasticity will clamp the disks to a slight degree, thus giving the rings an initial grip on the disks; and compression springs as 19 may be provided between the levers to normally hold their free ends apart, as a substitute for or to supplement the elasticity of the ring.

The driving lugs 20, $20^a$ are formed or securely attached on the inner peripheral wall of the driving drum, and one of these lugs extends inward between the free ends of the companion lever pertaining to each of the respective clamping rings; and the releasing detent 21 is pivoted preferably on the pin 22 between the driving lugs. The releasing detent is provided with the controlling lug 23 which extends between the free ends of the companion levers of both rings, and with the arms 24 having the beveled hooks 25, 25ª on the ends thereof, which hooks are adapted to alternately rotate to be adjacent to the outer sides of the free ends of the corresponding levers of both rings.

In use, when the driving drum is operated to rotate in the direction indicated by the arrow in Fig. 1, which for convenience is herein referred to as the forward direction, it is evident that the forward sides of the driving lugs 20 and 20ª will respectively impinge the inner sides of the free ends of the forward levers 9 and 9ª, thus clamping both rings 8 and 8ª around the friction disks and thereby positively driving both axle-sections 6 and 6ª in the forward direction. In this relation of the parts, the controlling lug of the releasing detent hangs with its forward side against the inner sides of both of the forward levers 9 and 9ª and with the forward beveled hook 25 adjacent to the outer sides of the free ends of the same levers. If, however, one axle section tends to rotate faster than the driving mechanism, as the section 6 pertaining to the outer wheel when rounding a curve, it is evident that the free end of the corresponding lever 9 will move forward to be free of the driving lug 19 and will impinge and be tripped by the forward hook 25 of the releasing detent, which serves to release the clamping contact of the ring 8 on the corresponding friction disk on the axle 6 and permits the same to rotate free of the driving mechanism. It will be understood that in this relation of the parts, the releasing detent is held against rotation on its pivot by the abutment of the forward side of its controlling lug against the inner side of the lever 9ª on the clamping ring 8ª, upon which ring devolves the whole driving load during the time the other ring is released; and that when the lever 9 is again impinged by the driving lug 19, as when the vehicle regains a straight course or rounds a reverse curve, the ring 8 will again be clamped on the disk 7 to positively drive the same. And when both axles tend to rotate faster than the driving drum, as when coasting down hill, the free ends of both the forward levers 9 and 9ª will impinge the inclined inner faces of the forward hook 25 of the releasing detent, and as this detent is now free to rotate on its pivot, its forward arm will be thrown upward by the sliding of the beveled face of the hook on the levers. As soon as the forward levers 9 and 9ª move away from the driving lugs, the positive clamping of the rings around both friction disks is at once released, and both disks and the corresponding axles are thus permitted to rotate free of the driving mechanism. This freedom continues as long as the driving lugs are not in contact with the levers, but in event the axles rotate far enough in advance of the driving drum to cause the free ends of the rear levers 10 and 10ª to impinge the rear side of the driving lugs, it is evident that both rings will again be clamped on the respective disks, thus positively clutching the same against the motor mechanism, the resistance of which serves to brake a further excessive rotation of the axles. In this operation of the parts, the inner sides of the rearward levers 10 and 10ª will have first impinged the rear side of the controlling lug 23 of the releasing detent and rotated the same forward to bring the rearward hook 25ª of this detent downward to be adjacent to the rear sides of the ends of the levers 10 and 10ª, thus reversing the relative arrangement of all the parts. And furthermore, when driving power is again required, the rotation of the axles will lag behind the driving drum, and the driving lugs will move forward from the rearward set of levers to impinge the forward set thereof, which movement first releases the clamping rings and then reëngages them with the friction disks to drive the axle sections forward, in which operation the rearward levers and the forward hook will be rotated downward to be adjacent to the forward levers, which rotation is positively accomplished by the abutment of the forward levers against the forward side of the controlling lug of the detent, which brings all the parts in normal position for being driven forward. And finally, when it is desired to drive the vehicle backward, it is only necessary to reverse the rotation of the driving drum, whereupon both driving lugs will move away from contact with the levers 9 and 9ª, and the same levers will impinge the beveled face of the forward hook 25 and throw the same upward; after which the driving lugs will impinge the rearward levers 10 and 10ª thus reclamping both rings on the disks, and at the same time the rearward hook 25ª of the detent will be rotated downward to be adjacent to the rear sides of the free ends of the rear levers, which rotation is positively accomplished by the abutment of the rear levers against the rear side of the controlling lug of the detent; thus bringing all the parts into a reverse arrangement and adapting the vehicle to be positively driven backward and to have either one or both of the clamping rings released and reëngaged in the same manner as when the vehicle is being driven forward.

The friction faces between the disks and the rings are generally formed truly cylindric, as shown in Fig. 2, but it is sometimes preferred to provide V-shaped grooves 26 in the disk 7ᵇ and 7ᶜ, with corresponding tongues 27 in the rings 7ᵇ and 8ᶜ, whereby the area of frictional contact is increased and a wedge action between the reversely beveled faces is obtained.

I claim:

1. A driving mechanism including a divided axle, disks on the axle sections, divided rings on the disks, levers pivoted to the adjacent ends of the rings, links connecting the ring pivots with companion levers of the same ring, a driving drum around the rings and having a lug thereon extending between the free ends of companion levers, and a detent pivoted on the drum and having a controlling lug extending between the free ends of the levers of both rings with hooks adapted to alternately engage the outer sides of the free ends of the levers.

2. A driving mechanism including a divided axle, disks on the axle sections, divided rings on the disks, levers pivoted to the adjacent ends of the rings, links connecting the ring pivots with companion levers of the same ring, and driving means around the rings including lugs extending between the free ends of companion levers and a pivoted detent having a controlling lug extending between the free ends of the levers of both rings with hooks adapted to alternately engage the outer sides of the free ends of the levers.

3. A driving mechanism including a divided axle, disks on the axle sections, divided rings on the disks, levers pivoted to the adjacent ends of the rings, links connecting the ring pivots with companion levers of the same ring, and driving means including lugs extending between the free ends of companion levers and a pivoted detent having a controlling lug extending between the free ends of the levers of both rings with hooks adapted to alternately engage the outer sides of the free ends of the levers.

4. A driving mechanism including a divided axle, disks on the axle sections, divided rings on the disks, levers and links connecting the adjacent ends of the rings, and driving means around the rings including lugs adapted to impinge the respective levers to clamp the corresponding rings and a pivoted detent having a lug controlled by the levers of both rings and having hooks adapted to be impinged by the respective driven levers to release either ring when it runs ahead of the other ring.

5. A driving mechanism including a divided axle, disks on the axle sections, divided rings on the disks, levers and links connecting the adjacent ends of the rings, and driving means including lugs adapted to impinge the respective levers to clamp the corresponding rings and a pivoted detent having a lug controlled by the levers of both rings and having hooks adapted to be impinged by the respective driven levers to release either ring when it runs ahead of the other ring.

6. A driving mechanism including a divided axle, disks on the axle sections, rings on the disks, means for clamping the rings and disks together including companion levers on each ring, and driving means including lugs adapted to impinge the respective levers to clamp the corresponding rings and a pivoted detent having a lug controlled by the levers of both rings and having hooks adapted to be impinged by the respective driven levers to release either ring when it runs ahead of the other ring.

7. A driving mechanism including a divided axle, disks on the axle sections with clamping rings thereon, clamping means including companion levers on each ring, and driving means adapted to operate on respective levers to clamp corresponding rings in either direction and having a pivoted detent with hooks adapted to alternately engage the corresponding levers of both rings and a lug adapted to be held by the lever of either ring when the other overruns, whereby the corresponding hook trips the lever of the other ring to release the ring.

8. A driving mechanism including a divided axle, disks on the axle sections, rings on the disks, means on the rings for clamping them on the disks, and driving means adapted to operate on the clamping means to clamp the rings and drive the disks in either direction to release both rings and then reclamp one or both against the driving means when both disks overrun, and to release one ring when it overruns and both rings when they overrun and to reclamp the one ring or both rings when overtaken by the driving means.

9. A driving mechanism including a divided axle, disks on the axle sections, rings adapted to be clamped on the disks, and means for clamping the rings on the disks and driving them in either direction to release both rings and then reclamp one or both against the driving means when both disks overrun, and to release one ring when it overruns and both rings when they overrun and then to reclamp the one ring or both rings when overtaken by the driving means.

10. A driving mechanism including a divided axle, annular friction elements on the axle sections, rings adapted to clamp the friction elements, and clamping means including companion levers on each ring, and driving means adapted to operate on respective levers to clamp and drive the friction elements in either direction, to release both elements and then reclamp one or both against the driving means when both elements overrun, and to release one element when it overruns and both elements when they overrun, and then to reclamp the one element or both elements when overtaken by the driving means.

11. A driving mechanism including an axle, a disk thereon, a divided ring on the disk, levers pivoted to the adjacent ends of the ring, links connecting each ring pivot with the other lever, and a driving drum around the ring and having a lug thereon extending between the free ends of the levers.

12. A driving mechanism including an axle, a disk thereon, a divided ring on the disk, levers pivoted to the adjacent ends of the ring, links connecting each ring pivot with the other lever, and driving means around the rings including a lug extending between the free ends of the levers.

13. A driving mechanism including an axle, a disk thereon, a divided ring on the disk, levers pivoted to the adjacent ends of the ring, links connecting each ring pivot with the other lever, and driving means including a lug extending between the free ends of the levers.

14. A driving mechanism including an axle, a disk thereon, a divided ring on the disk, levers and links connecting the adjacent ends of the ring, and driving means adapted to impinge the respective levers to clamp the ring and drive the disk in either direction.

15. A driving mechanism including an axle, an annular friction element thereon, a divided ring adapted to clamp the friction element, the friction faces being wedge-shaped, levers and links connecting the adjacent ends of the ring, and driving means adapted to impinge the respective levers to clamp the ring and drive the axle in either direction.

16. A driving mechanism including an axle, an annular friction element thereon, a ring adapted to clamp the friction element, clamping means including companion levers on the ring, and driving means adapted to operate on respective levers to drive the axle in either direction.

17. A driving mechanism including an axle, an annular friction element thereon, a ring adapted to clamp the friction element, the friction faces being wedge-shaped, clamping means including companion levers on the ring, and driving means adapted to operate on respective levers to drive the axle in either direction.

CHARLES H. JOHNSON.

Witnesses:
WM. R. RHOADS,
RUTH A. MILLER.